Patented Dec. 15, 1942

UNITED STATES PATENT OFFICE 2,304,821

DIARYL-GUANIDINE AND ARYL-BIGUANIDE SALTS OF DINITROPHENOLS

John N. Hansen and Frank B. Smith, Midland, Mich., assignors to The Dow Chemical Company, Midland, Mich., a corporation of Michigan No Drawing. Application February 14, 1941,
Serial No. 378,972

12 Claims. (Cl. 260—565)

This invention relates to the amine salts of nitro-phenols and is particularly concerned with diaryl-guanidine and aryl-biguanide addition salts of dinitro-phenols. We have prepared representative members of this group of compounds and found them, for the most part, to be crystalline solids, stable to light and air, and not appreciably affected by carbon dioxide. They are valuable as insecticides, fungicides, and bactericides, and as pigments. The expression "dinitrophenol" as herein employed refers to compounds containing two and only two nitro groups attached to the phenolic benzene ring in distinction to compounds containing one or more than two nitro groups, e. g. picric acid.

The new compounds are prepared by reacting a diaryl-guanidine or aryl-biguanide with a dinitro-phenol. The reaction may be carried out by contacting solutions of the two reactants in benzene or other suitable solvent. Substantially equimolecular proportions of dinitro-phenol and amine have been found to give the desired salts in good yield, although any suitable amounts may be employed. Where an excess of one or another of the reactants is present in the final product, separation is readily accomplished by extraction with benzene or other solvent in which the reactants are more soluble than is the amine salt product. The reaction can be carried out at any desired temperature up to the refluxing temperature of the reaction mixture, although reduced amounts of solvent are required at temperatures between about 40° and 120° C., under which conditions the solubility of the amine and phenol in the reaction solvent is relatively high. Frequently when the amine is added to the phenol solution, the insoluble addition salt of the phenol crystallizes out of the mixture. The formation of the amine salt is generally complete within about 1 hour after the reactants are combined. To insure the formation of a relatively homogeneous product and to minimize occlusion, the amine solution is preferably added portion-wise to the reaction mixture comprising the dinitro-phenol with stirring over a period of time. An advantage in such procedure is that a close control of the reaction temperature is thereby made possible, whereby decomposition due to excessive heat of reaction is avoided. Following completion of the reaction, the solid amine salts are separated by filtration, and may be further purified by recrystallization or by washing with small amounts of such solvents as benzene, chlorobenzene, etc. When spontaneous precipitation or crystallization of the salt product does not occur, the reaction mixture may be heated to evaporate off the solvent, leaving a residue of solid amine salt, which is thereafter purified according to known methods of fractional crystallization.

In an alternate procedure the diaryl-guanidine or aryl-biguanide hydrochlorides may be reacted with a solution of a water-soluble alkali metal dinitro-phenolate, whereby the addition salt of the phenol precipitates from the solution and may be separated in the usual manner.

While this invention is concerned with the diaryl-guanidine and aryl-biguanide salts of dinitro-phenols generally, it is especially directed to the salts obtained by the addition of such amines to 2.4-dinitro-phenols. A particularly valuable group of compounds are the addition salts of those phenols having the formula,

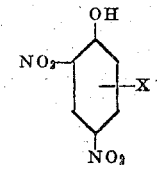

wherein X represents a radical selected from the group consisting of aryl, alkyl, cycloalkyl, and aralkyl. These compounds are high-melting crystalline solids, yellow to orange-red in color and having an extremely low solubility in water. This characteristic of low water solubility is of particular value, since it has been found that the foliage and other plant injury frequently attending the insecticidal use of nitro compounds is largely dependent upon the degree to which such compounds are soluble in water. This is of especial importance with respect to the use of aqueous sprays and in the maintaining of toxicant residues on tree surfaces which may be contacted with rain or dew.

Example 1

19.8 grams (0.1 mol) of 2.4-dinitro-6-methyl-phenol was dissolved in 25 milliliters of warm benzene. 21.1 grams (0.1 mol) of diphenyl-guanidine dissolved in 50 milliliters of boiling ethyl alcohol was added portion-wise with stirring to the phenol solution. The diphenyl-guanidine addition salt precipitated out of solution as formed, the reaction being substantially complete within 30 minutes of completion of the addition of the amine solution. The mixture was thereafter cooled to room temperature, filtered, and the residue washed with benzene and dried, whereby there was obtained 30 grams of the diphenyl-guanidine salt of 2.4-dinitro-6-methyl-phenol as yellow crystals melting at 150°-1° C. The solubility of this compound in water at 25° C. was 0.156 gram per 100 milliliters. The saturated water solution of the salt had a pH of 6.8.

Example 2

26.6 grams (0.1 mol) of 2.4-dinitro-6-cyclohexyl-phenol was dissolved in 25 milliliters of warm benzene. 21.12 grams (0.1 mol) of diphenyl-guanidine was suspended in 15 milliliters of boiling benzene and this suspension added portion-wise to the benzene solution of the phenol. The diphenyl-guanidine went into solution as added, and the reaction mixture turned dark orange-red in color. After all of the amine suspension had been added, the mixture was stirred for 30 minutes and thereafter heated to evaporate off the major portion of the benzene. The residue, which solidified on standing, was ground to a fine particle size, suspended in benzene, and the benzene suspension filtered. The resulting crystalline material was thoroughly washed with cold benzene and thereafter dried at 70° C., whereby there was obtained 46.1 grams of the diphenyl-guanidine salt of 2.4-dinitro-6-cyclohexyl-phenol as an orange-red solid melting at 172°–173° C. The solubility of this compound in water at 25° C. was 0.0066 gram per 100 milliliters. The saturated water solution of the salt had a pH of 6.3.

Example 3

18.4 grams (0.1 mol) of 2.4-dinitro-phenol and 17.7 grams (0.1 mol) of phenyl-biguanide were reacted together substantially as described in Example 1. In carrying out this reaction the 2.4-dinitro-phenol was dissolved in warm benzene and a solution of the phenyl-biguanide in boiling ethanol added portion-wise thereto. The reaction mixture was then cooled to room temperature and filtered to obtain the desired amine addition salt. This product was washed with cold benzene and air-dried, whereby there was obtained 33.5 grams of the phenyl-biguanide salt of 2.4-dinitro-phenol as a yellow crystalline product melting at 162°–163° C. The solubility of this compound in water at 25° C. was 0.47 gram per 100 milliliters. The saturated water solution of the salt had a pH of 7.3.

Example 4

In a similar fashion equimolecular proportions of 2.4-dinitro-6-cyclohexyl-phenol and phenyl-biguanide were reacted together, whereby there was obtained a 91 per cent yield of the phenyl-biguanide salt of 2.4-dinitro-6-cyclohexyl-phenol as an orange crystalline compound melting at 183° C. and having a solubility in water at 25° C. of 0.013 gram per 100 milliliters. A saturated water solution of this salt had a pH of 6.6.

Other phenols which may be substituted for those shown in the foregoing examples include 2.6-dinitro-phenol, 2.5-dinitro-phenol, 2.6-dinitro-4-methyl-phenol, 2.4-dinitro-6-n-hexyl-phenol, 2.4-dinitro-6-phenyl-phenol, 2.4-dinitro-6-benzyl-phenol, 2.4-dinitro-6-chloro-phenol, 2.4-dinitro-5-naphthylamino-phenol, 2.5-dinitro-6-cyclohexyl-phenol, 2.4-dinitro-5-cyclohexyl-phenol, 2.6-dinitro-4-cyclohexyl-phenol, and the like. Similarly other diaryl-guanidines and aryl-biguanides may be employed substantially as shown, e. g. alpha-naphthyl-biguanide, xylyl-biguanide, tolyl-biguanide, chlorophenyl-biguanide, dixylyl-guanidine, ditolyl-guanidine, di-(chlorophenyl)-guanidine, and dixenyl-guanidine.

A copending application Serial No. 379,015, filed concurrently herewith claims parasiticidal compositions comprising the amine addition salts of dinitro-phenols as herein described.

Other modes of applying the principle of our invention may be employed instead of those explained, change being made as regards the materials employed, provided the products described in the following claims be thereby obtained.

We therefore particularly point out and distinctly claim as our invention:

1. A compound selected from the group consisting of the diaryl-guanidine and aryl-biguanide salts of dinitro-phenols.
2. A diaryl-guanidine salt of a 2.4-dinitro-phenol.
3. A diaryl-guanidine salt of a phenol having the formula,

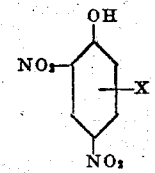

wherein X represents a radical selected from the group consisting of aryl, alkyl, cycloalkyl, and aralkyl.

4. A diphenyl-guanidine salt of a 2.4-dinitro-phenol.
5. A diphenyl-guanidine salt of a phenol having the formula,

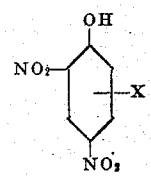

wherein X represents a radical selected from the group consisting of aryl, alkyl, cycloalkyl, and aralkyl.

6. The diphenyl-guanidine salt of 2.4-dinitro-6-methyl-phenol.
7. The diphenyl-guanidine salt of 2.4-dinitro-6-cyclohexyl-phenol.
8. An aryl-biguanide salt of a 2.4-dinitro-phenol.
9. An aryl biguanide salt of a phenol having the formula,

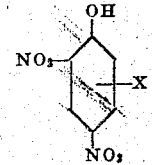

wherein X represents a radical selected from the group consisting of aryl, alkyl, cycloalkyl, and aralkyl.

10. A phenyl-biguanide salt of a 2.4-dinitro-phenol.
11. A phenyl-biguanide salt of a phenol having the formula

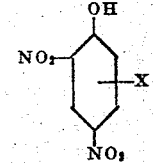

wherein X represents a radical selected from the group consisting of aryl, alkyl, cycloalkyl, and aralkyl.

12. The phenyl-biguanide salt of 2.4-dinitro-6-cyclohexyl-phenol.

JOHN N. HANSEN.
FRANK B. SMITH.